(12) United States Patent
Yun

(10) Patent No.: US 8,970,163 B2
(45) Date of Patent: Mar. 3, 2015

(54) CHARGE CONTROL SYSTEM OF BATTERY PACK

(75) Inventor: Hanseok Yun, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 536 days.

(21) Appl. No.: 13/137,884

(22) Filed: Sep. 20, 2011

(65) Prior Publication Data

US 2012/0139479 A1 Jun. 7, 2012

(30) Foreign Application Priority Data

Dec. 1, 2010 (KR) .......................... 10-2010-0121327

(51) Int. Cl.
*H02J 7/00* (2006.01)
*H02J 7/06* (2006.01)

(52) U.S. Cl.
CPC ............. *H02J 7/0004* (2013.01); *H02J 7/0011* (2013.01); *H02J 7/0031* (2013.01)
USPC ............. 320/106; 320/160; 320/163; 320/134

(58) Field of Classification Search
CPC ............................. H02J 7/0004; H02J 7/0011
USPC .................. 320/107, 112, 134, 106, 160, 163
See application file for complete search history.

(56) References Cited

U.S. PATENT DOCUMENTS

| | | | | |
|---|---|---|---|---|
| 5,764,028 A | * | 6/1998 | Freiman et al. ............... | 320/106 |
| 6,087,803 A | * | 7/2000 | Eguchi et al. ................. | 320/106 |
| 6,291,965 B1 | * | 9/2001 | Nagai et al. ................... | 320/106 |
| 6,380,763 B1 | | 4/2002 | Ando | |
| 6,677,726 B2 | * | 1/2004 | Hensel ........................... | 320/108 |
| 8,212,529 B2 | * | 7/2012 | Yamamoto ..................... | 320/134 |
| 8,305,035 B2 | * | 11/2012 | Morita et al. .................. | 320/107 |
| 8,378,868 B2 | * | 2/2013 | Lyles et al. ..................... | 341/143 |
| 8,384,355 B2 | * | 2/2013 | Koike et al. ................... | 320/132 |
| 2011/0068735 A1 | * | 3/2011 | Nicholson et al. ............. | 320/107 |
| 2011/0140673 A1 | * | 6/2011 | Zhang et al. ................... | 320/145 |

FOREIGN PATENT DOCUMENTS

| | | |
|---|---|---|
| JP | 2005-086878 A | 3/2005 |
| JP | 2008-005593 A | 1/2008 |
| JP | 2008-029187 A | 2/2008 |
| JP | 2009-112115 A | 5/2009 |
| KR | 10 2001-0014735 A | 2/2001 |
| KR | 10-2009-0099151 A | 9/2009 |

OTHER PUBLICATIONS

Korean Office Action in KR 10-2010-0121327, dated Jan. 13, 2012 (YUN).

* cited by examiner

*Primary Examiner* — Richard V Muralidar
*Assistant Examiner* — David Henze-Gongola
(74) *Attorney, Agent, or Firm* — Lee & Morse, P.C.

(57) ABSTRACT

Provided is a charge control system of a battery pack. The charge control system includes a charge unit, a battery management unit, a charger management unit, and a voltage level shift unit. The charge unit charges a battery. The battery management unit includes first and second ports, determines one of a charge mode and charge stop mode of the battery according to whether the charge unit is disabled, and controls outputs of the first and second ports according to the determined result. The charger management unit is connected to a data input terminal of a charger, and controls an operation of the charger according to a voltage level of the data input terminal. The voltage level shift unit shifts a voltage level of the data input terminal according to the outputs of the first and second ports.

19 Claims, 1 Drawing Sheet

CHARGE CONTROL SYSTEM OF BATTERY PACK

BACKGROUND

1. Field

Embodiments relate to a charge control system of a battery pack.

2. Description of the Related Art

Secondary batteries are actively being researched due to development of portable electronic devices such as cellular phones, notebook computers, camcorders and Personal Digital Assistants (PDAs).

Such secondary batteries are manufactured in a battery pack type that includes a battery and a charge/discharge circuit. A battery is charged by an external power source or is discharged by an external load, through an external terminal disposed in a battery pack. That is, when the battery pack is connected to the external power source through the external terminal, the battery is charged by the external power source that is supplied through the external terminal and the charge/discharge circuit. Moreover, when the external load is connected to the battery pack through the external terminal, a discharge operation is performed where the power source of the battery is supplied to the external load through the charge/discharge circuit and the external terminal. At this point, the charge/discharge circuit controls charge/discharge of the battery between the external terminal and the battery.

Generally, batteries are charged with the maximum charge current until the voltages of the batteries reach a certain voltage level and then a charge current is slowly reduced when the voltages of the batteries reach a certain voltage level.

In the cases of notebook computers, when a charge/discharge switch is disabled in a charge/discharge circuit, a fuse is cut and thus charge of a battery is controlled. However, in the cases of electric bicycles, it is difficult to apply a fuse because a working voltage is high and a high current flows.

SUMMARY

One or more embodiments provide a charge control system of a battery pack, which can stably protect a battery when a charge/discharge device of the battery is disabled.

One or more embodiments may provide a battery charge control system, comprising a charge unit configured to charge a battery, a battery management unit including first and second ports, and configured to determine one of a charge mode and charge stop mode of the battery according to whether the charge unit is disabled, and to control outputs of the first and second ports according to the determined result, a charger management unit connected to a data input terminal of a charger, and configured to control an operation of the charger according to a voltage level of the data input terminal, and a voltage level shift unit configured to shift a voltage level of the data input terminal according to the outputs of the first and second ports.

The data input terminal may include a first input terminal and a second input terminal, and the voltage level shift unit may include a first resistor including a first terminal connected to the first input terminal, a first transistor including a first terminal connected to a second terminal of the first resistor, a second terminal connected to the second input terminal, and a control terminal connected to the first port, a second resistor including a first terminal connected to the second terminal of the first resistor, a second transistor including a first terminal connected to the second terminal of the first resistor, a second terminal connected to the second input terminal, and a control terminal connected to the second port, and a third resistor including a first terminal connected to the second terminal of the first resistor and a second terminal connected to the second input terminal.

A resistance value of the first resistor may be less than a resistance value of the second resistor and the resistance value of the second resistor may be less than a resistance value of the third resistor.

The voltage level shift unit may include a first voltage divider, the first voltage divider including a first division resistor connected between the first port and the control terminal of the first transistor, and a second division resistor connected between the control terminal and second terminal of the first transistor.

The voltage level shift unit further may include a second voltage divider, the second voltage divider including a third division resistor connected between the second port and the control terminal of the second transistor, and a fourth division resistor connected between the control terminal and second terminal of the second transistor.

The battery charge control system may include a first capacitor connected between the first and second terminal of the first transistor, a second capacitor connected to the third resistor in parallel, and a zener diode including a cathode connected to the second terminal of the first resistor, and an anode connected to the second input terminal.

The charger management unit may include a pull-down resistor connected between a power source and the first input terminal.

The battery management unit may determine the charge mode when the charge unit operates normally, and the battery management unit may determine the charge stop mode when the charge unit is disabled.

In the charge mode, the battery management unit may turn off the output of the first port and may turn on the output of the second port, in the charge mode.

In the charge mode, the charger management unit may operate the charger.

In the charge stop mode, the battery management unit may turn on the output of the first port.

In the charge stop mode, the charger management unit may stop an operation of the charger.

The battery management unit may determine one of the charge mode and a precharge mode according to a voltage of the battery when the charge unit operates normally.

The battery management unit may turn off the outputs of the first and second ports in the precharge mode.

The charger management unit may operate the charger in the precharge mode.

BRIEF DESCRIPTION OF THE DRAWINGS

Features will become more apparent to those of ordinary skill in the art by describing in detail exemplary embodiments with reference to the attached drawings, in which.

DETAILED DESCRIPTION

Figure 1:
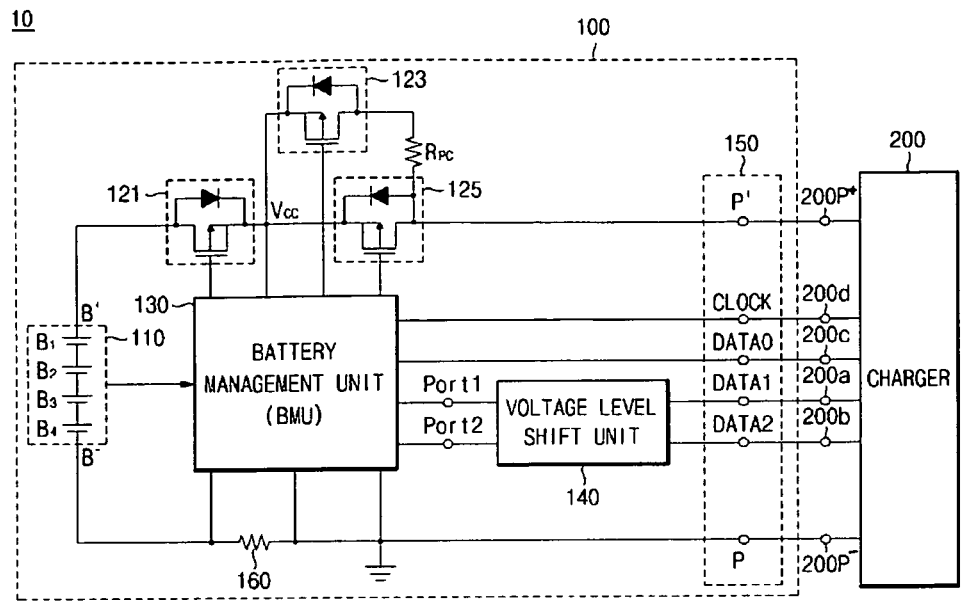
FIG. 1 illustrates a circuit diagram of an exemplary embodiment of a charge control system of a battery pack.

Korean Patent Application No. 10-2010-0121327 filed on Dec. 1, 2010, in the Korean Intellectual Property Office, and entitled: "Charge Control System of Battery Pack" is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In the drawing figures, it will also be understood that when an element is referred to as being "between" two elements, it can be the only element between the two elements, or one or more intervening elements may also be present. It is also understood that when an element is referred to as being "connected to" or "coupled to" another element, the element and the another element may be directly connected or coupled to each other, or one or more other intervening elements may be present. Like reference numerals refer to like elements throughout the specification.

Hereinafter, a charge control system of a battery pack according to an exemplary embodiment will be described.

Figure 2:
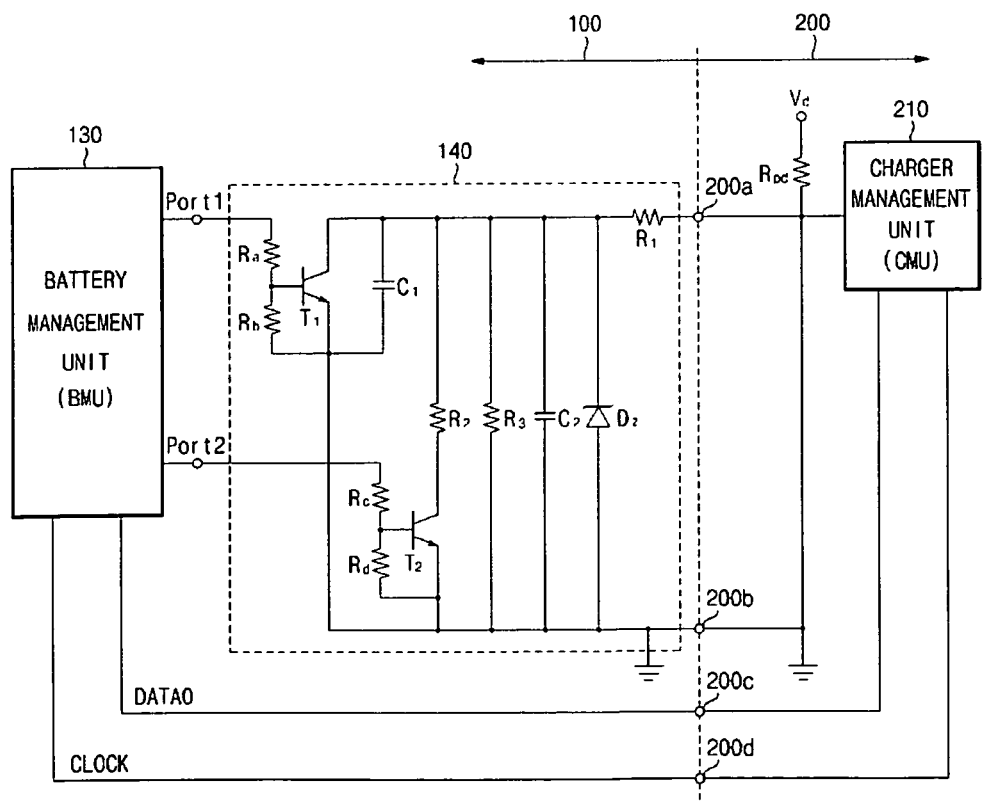
FIG. 2 illustrates a circuit diagram of an exemplary embodiment and exemplary configuration of a voltage level shift unit within the charge control system of FIG. 1.

FIG. 1 illustrates a circuit diagram of an exemplary embodiment of a charge control system 10 of a battery pack. FIG. 2 illustrates a circuit diagram of an exemplary embodiment and an exemplary configuration of a voltage level shift unit 140 of the charge control system 10 of FIG. 1. An exemplary operation of the charge control system of a battery pack 10 will be described in connection with FIGS. 1 and 2.

Referring to FIGS. 1 and 2, the charge control system 10 of a battery pack may include a battery pack 100 and a charger 200.

The battery pack 100 may include a battery 110, a charge unit 121 and 123, a discharge unit 125, a battery management unit 130, a voltage level shift unit 140, a connector 150, and a sensor resistor 160.

The battery pack 100 may be connected to the charger 200 through the connector 150. The charger 200 may perform a charge operation of the battery 110. Embodiments are not, however, limited thereto. For example, although not shown, the battery pack 100 may be connected to an external load such as a hand phone, a portable notebook computer, etc. through the connector 150 instead of the charger 200, and a discharge operation of the battery 110 may be performed. A high current path between the connector 150 and the battery 110 is used as a charge/discharge path, and a relative large current may flow through the high current path.

All sorts of devices that supply a power source required to charge the battery 110 of the battery pack 100 may be used as the charger 200. For example, an adaptor or a portable notebook computer connected to the adaptor supplying a power source may be used as the charger 200.

The charger 200 may include, e.g., power source terminals, e.g., 200p+, 200p−, data input terminals, e.g., first through fourth data input terminals 200a, 200b, 200c, 200d, a pull-down resistor Rpd, and a charger management unit 210.

The power source terminals 200p+, 200p− of the charger 200 may be respectively connected to first and second pack terminals P+ and P− of the connector 150. The data input terminals 200d, 200c, 200b, 200a of the charger 200 may be respectively connected to communication terminals CLOCK, DATA0, DATA2, DATA1 of the connector 150. More particularly, the data input terminals of the charger 200 may be connected to the charger management unit 210 of the charger 200.

The charger management unit 210 may receive voltage information from the battery management unit 130 through the third and/or fourth input terminals 200c, 200d and may receive charge control information through the first and second input terminals 200a and 200b. The charger management unit 210 may control the operation of the charger 200 based on information that is transferred through the data input terminals 200a, 200b, 200c, 200d. The pull-down resistor Rpd may be connected between a power source Vd and the first input terminal 200a. The charger management unit 210 will be described below in more detail.

Hereinafter, an exemplary configuration of the battery pack 100 and charger 200 will be described in more detail.

The battery 110 may include one or more battery cells, e.g., B1 to B4. The battery 110 may be charged or discharged to a certain voltage. B+ and B− of FIG. 1 are high current terminals, and correspond to first and second terminal terminals B+ and B− of the serially-connected battery cells B1 to B4. Herein, the first terminal B+ may be a positive terminal, and the second terminal B− may be a negative terminal. The number of battery cells of the battery 100 according to an embodiment may vary according to a capacity required by an external load.

The charge unit 121, 123 and the discharge unit 125 may be connected to a high current path between the battery 110 and the connector 150, and may function to charge/discharge the battery 110. More particularly, the charge unit 121, 123 may correspond to a charge device 121 and a precharge device 123. The charge device 121 may include a first field effect transistor (hereinafter referred to as FET1) and a first parasitic diode (hereinafter referred to as DD. The precharge device 123 may include a second field effect transistor (hereinafter referred to as FET2), a second parasitic diode (hereinafter referred to as D2). A precharge resistor Rpc may be included between the charge device 121 and the precharge device 123. In one or more embodiments, the precharge resistor Rpc may be included in the precharge device 123. The discharge unit 125 may include a discharge device. The discharge device 125 may include a third field effect transistor (hereinafter referred to as FET3) and a third parasitic diode (hereinafter referred to as D3).

A connection direction between the source and drain of the FET1 may be set to be a same direction as that of the FET2 and a direction opposite to the FET3. Due to such configuration, the FET1 and the FET2 may restrict current flow from the connector 150 to the battery 110. Also, the FET2 may restrict the amount of current with the precharge resistor Rpc. The FET3 may restrict current flow from the battery 110 to the connector 150. In FIG. 1, the FET1, FET2 and FET3 are illustrated as switching devices, but embodiments are not limited thereto. Instead of the FET1, FET2 and FET3, other kinds of electronic devices performing a switching function may be used. The first and third parasitic diodes D1 and D3 may be configured in order for a current to flow in a direction opposite to a direction restricting the current. Also, the second and third parasitic diodes D2 and D3 may be configured in order for a current to flow in a direction opposite to a direction restricting the current.

The battery management unit 130 may be connected to the battery 110, the charge device 121, the precharge device 123, the discharge unit 125, the voltage level shift unit 140, the connector 150 and the sensor resistor 160. The battery management unit 130 may be implemented as an Integrated Circuit (IC).

The battery management unit 130 may detect the voltage of the battery 110, and may control the operations of the charge device 121, precharge device 123 and discharge unit 125 according to the detected voltage.

For example, when the charger 200 is connected to the battery pack 100 through the connector 150, the battery management unit 130 may set the FET1 of the charge device 121 to a turn-on state and may set the FET3 of the discharge device 125 to a turn-off state, thereby allowing the battery 110 to be charged. When a voltage is excessively charged in the battery 110, the battery management unit 130 sets the FET2 to a turn-on state, thereby allowing the battery 110 to be charged. More particularly, by turning on the FET2, the battery management unit 130 allows the battery 110 to be slowly charged to a certain voltage level by the precharge resistor Rpc of the precharge device 123, thereby preventing abnormal heating. When an external load is connected to the battery pack 100 through the connector 150, the battery management unit 130 sets the FET1 of the charge device 121 to a turn-off state and sets the FET3 of the discharge device 125 to a turn-on state, thereby allowing the battery 110 to be discharged. Although not shown, the battery management unit 130 may sense all the voltages of the battery cells B1 to B4.

The battery management unit 130 may determine any one of a charge mode, a precharge mode and a charge stop mode according to the detected voltage of the battery 110 and the fault or normality of the charge unit 121 and 123. The battery management unit 130 may include a first port Port1 and a second port Port2, and may control outputs of the first and second ports Port1 and Port2 according to the determined mode, e.g., charge mode, charge stop mode, precharge mode, based on the detected voltage of the battery 110 and a fault or a normal state of the charge unit 121 and 123.

For example, when the charge unit 121 and 123 operates normally, the battery management unit 130 may control the operation of the charge device 121 or the operation of the precharge device 123, and the outputs of the first and second ports Port1 and Port2, according to the detected voltage of the battery 110. More particularly, e.g., when the determined mode is the precharge mode, the battery management unit 130 may set the precharge device 123 to a turn-on state, turn off the first port Port1, and turn on the second port Port2. When the charge unit 121 and/or the precharge device 123 do not normally operate (i.e., the charge unit 121 and/or 123 are disabled), the battery management unit 130 may turn on the first port Port1 regardless of the detected voltage of the battery 110. At this point, the output state of the second port Port2 is irrelevant. The battery management unit 130 will be described below in more detail.

Referring to FIGS. 1 and 2, an input terminal of the voltage level shift unit 140 may be connected to the first and second ports Port1 and Port2 of the battery management unit 130, and an output terminal of the voltage level shift unit 140 may be connected to the data input terminal of the charger 200 through the connector 150. As discussed above, in one or more embodiments, the data input terminal of the charger 200 may include the first to third input terminals 200a to 200c. The voltage level shift unit 140 may be connected to the data input terminals 200a, 200b of the charger 200 through the data terminals DATA0 to DATA2 of the connector 150. The voltage level shift unit 140 may shift the voltage level of the data input terminal of the charger 200 according to the outputs of the first port Port1 and the second port Port2 of the battery management unit 130.

The voltage level shift unit 140 may include a first voltage divider Ra and Rb, a first transistor T1, a second voltage divider Rc and Rd, a second transistor T2, a first resistor R1, a second resistor R2, a third resistor R3, a first capacitor C1, a second capacitor C2, and a zener diode Dz.

The first voltage divider Ra and Rb may include a first division resistor Ra and a second division resistor Rb. A first terminal of the first division resistor Ra may be electrically connected to the first port Port1 of the battery management unit 130, and a second terminal of the first division resistor Ra may be electrically connected to a first terminal of the second division resistor Rb. A second terminal of the second division resistor Rb may be electrically connected to a second terminal of the first transistor T1.

The first transistor T1 may include a first terminal, the second terminal, and a control terminal. The control terminal of the first transistor T1 may be electrically connected to a connection node between the first division resistor Ra and the second division resistor Rb. That is, the control terminal of the first transistor T1 may be electrically connected to the second terminal of the first division resistor Ra and the first terminal of the second division resistor Rb. The first terminal of the first transistor T1 may be electrically connected the first input terminal 200a of the charger 200.

A first terminal of the first resistor R1 may be electrically connected to the first port Port1, and a second terminal of first resistor R1 may be electrically connected to the first terminal of the first transistor T1.

The second voltage divider Rc and Rd may include a third division resistor Rc and a fourth division resistor Rd. A first terminal of the third division resistor Rc may be electrically connected to the second port Port2 of the battery management unit 130, and a second terminal of the third division resistor Rc may be electrically connected to a first terminal of the fourth division resistor Rd. A second terminal of the fourth division resistor Rd may be electrically connected to a second terminal of the second transistor T2.

The second transistor T2 may include a first terminal, the second terminal, and a control terminal. The control terminal of the second transistor T2 may be electrically connected to a connection node between the third division resistor Rc and the fourth division resistor Rd. That is, the control terminal of the second transistor T2 may be electrically connected to the second terminal of the third division resistor Rc and the first terminal of the fourth division resistor Rd. The first terminal of the second transistor T1 may be electrically connected to the second terminal of the first resistor R1. The second terminal of the second transistor T2 may be electrically connected the second input terminal 200b of the charger 200.

A first terminal of the second resistor R2 may be electrically connected to the second port Port2, and a second terminal of the second resistor R2 may be electrically connected to the second terminal of the second transistor T2, i.e., the second input terminal 200b of the charger 200.

A first terminal of the third resistor R3 may be electrically connected between the second terminal of the first resistor R1 and a second terminal of the third resistor R3 may be electrically connected between to the second input terminal 200b of the charger 200.

Resistance values of the first, second, and third resistors R1, R2, R3 may increase in the order of the first, second, and third resistors R1, R2, R3. More particularly, e.g., in one or more embodiments, the first resistance value of the first resistor R1 may be less than the second resistance value of the second resistor R2, and the second resistance value of the second resistor R2 may be less than the third resistance value of the third resistor R3. Particularly, the first resistance value of the first resistor R1 may be considerably less than the resistance values of the second and third resistors R2 and R3. For example, the first resistor R1 may have about 56 Ohm, the second resistor R2 may have about 5.1 KOhm, and the third resistor R3 may have about 6 KOhm.

A first terminal of the first capacitor C1 may be electrically connected to the first terminal of the first transistor T1, and a second terminal of the first capacitor C1 may be electrically connected to the second terminal of the first transistor T1.

The second capacitor C2 may be connected in parallel with the third resistor R3. For example, a first terminal of the second capacitor C2 may be electrically connected between the second terminal of the first resistor R1 and a second terminal of the second capacitor C2 may be electrically connected between to the second input terminal 200b of the charger 200.

The zener diode Dz may include an anode and a cathode. The anode of the zener diode Dz may be electrically connected to the second input terminal 200b of the charger 200, and the cathode may be electrically connected to the other end of the second terminal of the first resistor R1.

The connector 150 may be connected to the battery 110. The connector 150 may be connected to the battery 110 or an external load, and thus, may serve as a terminal in charging/discharging of the battery 110. For this, the connector 150 may include a first pack terminal P+ and a second pack terminal P−. The first pack terminal P+ may be a positive pack terminal that is connected to the first terminal B+, and the second pack terminal P− may be a negative pack terminal that is connected to the second terminal B−. When the charger 200 is connected to the connector 150, the battery 110 may be charged by the charger 200. When an external load is connected to the connector 150, discharge is made from the battery 100 to the external load. A power source terminal VCC may be connected between the first pack terminal P+, the battery management unit 130 and the first terminal B+ of the battery 110. The power source terminal VCC may provide a path for supplying the power source of the battery 110 to the battery management unit 130, or when the charger 200 is connected to the battery pack 100 through the connector 150, the power source terminal VCC may provide a path through which the charge power source of the charger 200 is supplied.

The connector 150 may include a communication terminals CLOCK and DATA connected to the battery management unit 130. More particularly, the connector 150 may include the clock terminal CLOCK and the data terminals DATA0 to DATA2. When the charger 200 is connected to the connector 150, the communication terminals CLOCK and DATA may enable communication between the battery management unit 130 and the charger 200. For example, the communication terminals CLOCK and DATA may transfer the voltage information and charge control information of the battery 110 from the battery management unit 130 to the charger 200.

Referring to FIG. 1, the sensor resistor 160 may be connected to a high current path between the battery 110 and the connector 150. Specifically, the sensor resistor 160 may be connected between the second terminal B− of the battery 100 and the second pack terminal P−. The sensor resistor 160 may be connected to the battery management unit 130. Therefore, the sensor resistor 160 may allow the battery management unit 130 to check a voltage value between both terminals of the sensor resistor 160 and a resistance value of the sensor resistor 160, and thereby check a charge/discharge current. Accordingly, the sensor resistor 160 may provide information of the charge current or discharge current of the battery 110 to the battery management unit 130.

Next, an exemplary operation of the charge control system 10 according to an embodiment will be described below in detail with reference to FIG. 2.

A Table including exemplary port output states of the battery management unit 130, voltage levels of the data input terminal of the charger 200 and charge control modes of the charge control system 10 is provided below. Embodiments are not limited to the exemplary states/levels/modes provided in the following Table.

TABLE

| Battery management unit 130 | | Voltage level of input terminal of charger 200 | Charge control mode |
|---|---|---|---|
| First port Port1 | Second port Port2 | | |
| Off | Off | More than 4 V | Precharge mode |
| Off | On | 1 V to 4 V | Charge mode |
| On | On or Off | Less than 1 V | Charge stop mode |

The Table corresponds to an exemplary embodiment in which the first resistor R1 of the voltage level shift unit 140 has a resistance value of 56 Ohm, the second resistor R2 has a resistance value of 5.1 KOhm, the third resistor R3 has a resistance value of 6 KOhm, the pull-down resistor Rpd of the charger 200 has a resistance value of 10.5 KOhm and the voltage Vd is 12 V.

The battery management unit 130 determines the charge control mode according to the detected voltage of the battery 110 and the fault or normal state of the charge units 121, 123. More particularly, the battery management unit 130 may first determine whether the charge unit 121 and 123 operates normally. When the determined result shows that the charge unit 121 and 123 operates normally, the battery management unit 130 may determine the precharge mode or the charge mode on the basis of the detected voltage of the battery 110.

1) Precharge Mode

When the determined result shows the precharge mode, the battery management unit 130 may turn off outputs of the first and second ports Port1 and Port2. Therefore, the first and second transistors T1 and T2 are turned off, and the pull-down resistor Rpd, the first resistor R1 and the third resistor R3 may be connected between the power source Vd and second input terminal 200b of the charger 200. In such embodiments, since the first resistor R1 has a resistance considerably less than the resistance of the third resistor R3, most of the voltage Vd may be distributed to the pull-down resistor Rpd and the third resistor R3 and may be applied. Accordingly, a voltage of about 4.34 V may be applied to the third resistor R3 according to the voltage divider rule. The second terminal of the third resistor R3 is connected to the first input terminal 200b of the charger 200, and thus a voltage of about 4.34 V may be applied to the charger management unit 210. In this case, since a voltage applied to the second input terminal 200b exceeds 4 V, the charger management unit 210 recognizes the precharge mode and controls the operation of the charger 200 in the precharge mode.

2) Charge Mode

When the determined result shows the charge mode, the battery management unit 130 may turn off the output of the first port Port1 and may turn on the output of the second port Port2. Therefore, the first transistor T1 is turned off, the second transistor T2 is turned on, and the first to third resistors R1 to R3 may be connected between the power source Vd and second input terminal 200b of the charger 200. In such embodiments, the second and third resistors R2 and R3 may be connected in parallel, and a composite resistance (R2//R3) of the second and third resistors R2 and R3 may be about 2.75 KOhm. In one or more embodiments, the first resistor R1 may have a resistance value considerably less than the composite resistance (R2//R3), and thus most of the voltage Vd may be distributed to the pull-down resistor Rpd and the composite resistor (R2//R3) and may be applied. Accordingly, a voltage of about 2.5 V may be applied to the second input terminal 200b of the charger 200 according to the voltage divider rule. In this case, since a voltage applied to the second input terminal 200b is equal to and/or within a range of about 1 V to about 4 V, the charger management unit 210 recognizes the charge mode and controls the operation of the charger 200 in the charge mode.

3) Charge Stop Mode

When the charge unit 121, 123 are not operating normally (i.e., the determined result shows the fault of the charge unit 121, 123), the battery management unit 130 turns on the output of the first port Port1 irrespective of the detected voltage of the battery 110. At this point, even if the output of the second port Port2 is turned on/off, the output of the second port Port2 is irrelevant. Therefore, the first transistor T1 is turned on, and thus, a current from the power source Vd flows to the second input terminal 200b through the pull-down resistor Rpd, the first resistor R1 and the first transistor T1. At this point, since the second and third resistors R2 and R3 have resistance values considerably greater than that of the first resistor R1, a current flow through the first resistor R1 and the first transistor T1. Accordingly, about 0.6 V may be applied to the first input terminal 200b due to the first resistor R1. In this case, since the voltage of the first input terminal 200b is less than about 1 V, the charger management unit 210 recognizes the charge stop mode and immediately stops the operation of the charger 200.

The operation of the charge control system 10 is not limited to the above description, and it is merely an example for understanding. It is apparent to those skilled in the art that the charge control system 10 may variously change the precharge mode, the charge mode and the charge stop mode according to the port output control of the battery management unit 130 and the voltage level of the input terminal of the charger 200.

One or more embodiments provide a charge control system of the battery pack that can stably protect the battery when the charge/discharge device of the battery is disabled.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery charge control system, the system comprising:
a charge unit configured to charge a battery, the charge unit being connected to a high current path between the battery and charge/discharge terminals of the battery;
a battery management unit including a first port and a second port, and configured to determine a mode of the battery according to a status of the charge unit whether the charge unit is operating normally or is disabled, the mode including a charge mode and a charge stop mode, and to control outputs of the first port and the second port by selectively turning on or turning off the outputs of the first port and the second port based on the determination; and
a voltage level shift unit configured to shift a voltage level of a data input terminal of a charger connected to a charger management unit according to the outputs of the first port and the second port, wherein:
the data input terminal includes a first input terminal and a second input terminal, the first input terminal and second input terminal corresponding to the first port and the second port, and
the voltage level shift unit includes:
a first resistor including a first terminal connected to the first input terminal;
a first transistor including a first terminal connected to a second terminal of the first resistor, a second terminal connected to the second input terminal, and a control terminal connected to the first port;
a second resistor including a first terminal connected to the second terminal of the first resistor;
a second transistor including a first terminal connected to a second terminal of the second resistor, a second terminal connected to the second input terminal, and a control terminal connected to the second port; and
a third resistor including a first terminal connected to the second terminal of the first resistor and a second terminal connected to the second input terminal.

2. The battery charge control system as claimed in claim 1, wherein a resistance value of the first resistor is less than a resistance value of the second resistor and the resistance value of the second resistor is less than a resistance value of the third resistor.

3. The battery charge control system as claimed in claim 1, wherein the voltage level shift unit further includes a first voltage divider, the first voltage divider including:
a first division resistor connected between the first port and the control terminal of the first transistor; and
a second division resistor connected between the control terminal of the first transistor and the second terminal of the first transistor.

4. The battery charge control system as claimed in claim 1, wherein the voltage level shift unit further includes a second voltage divider, the second voltage divider including:
a third division resistor connected between the second port of the second transistor and the control terminal of the second transistor; and
a fourth division resistor connected between the control terminal of the second transistor and the second terminal of the second transistor.

5. The battery charge control system as claimed in claim 1, further comprising:
a first capacitor connected between the first terminal of the first transistor and the second terminal of the first transistor;
a second capacitor connected to the third resistor in parallel; and
a zener diode including a cathode connected to the second terminal of the first resistor, and an anode connected to the second input terminal.

6. The battery charge control system claimed in claim 1, wherein the charger management unit further includes a pull-down resistor connected between a power source and the first input terminal.

7. The battery charge control system as claimed in claim 1, wherein:
the battery management unit is configured to determine the charge mode in response to detection of the charge unit being operated normally, and
the battery management unit is configured to determine the charge stop mode in response to detection of the charge unit being disabled.

8. The battery charge control system as claimed in claim 7, wherein, in the charge mode, the battery management unit is configured to turn off the output of the first port and to turn on the output of the second port.

9. The battery charge control system as claimed in claim 8, wherein, in the charge mode, the charger management unit is configured to control an operation of the charger.

10. The battery charge control system as claimed in claim 7, wherein, in the charge stop mode, the battery management unit is configured to turn on the output of the first port.

11. The battery charge control system as claimed in claim 10, wherein, in the charge stop mode, the charger management unit is configured to stop an operation of the charger.

12. The battery charge control system as claimed in claim 7, wherein the battery management unit is further configured to determine whether one of modes is the charge mode or a precharge mode to in response to detection of a voltage of the battery and the charge unit being operated normally.

13. The battery charge control system as claimed in claim 12, wherein the battery management unit is configured to turn off the outputs of the first port and the second port in the precharge mode.

14. The battery charge control system as claimed in claim 13, wherein the charger management unit is configured to control an operation of the charger in the precharge mode.

15. The battery charge control system as claimed in claim 1, wherein the charge unit includes a charge device and a precharge device, and a precharge resistor is connected to the precharge device.

16. The battery charge control system as claimed in claim 15, wherein the charge device and the precharge device include a diode, respectively, and the diode of the charge device is disposed directly opposite direction of the diode of the precharge device.

17. The battery charge control system as claimed in claim 1, wherein the control terminal of the first transistor is connected to the second terminal of the first resistor and the first terminal of the second resistor.

18. An apparatus, comprising:
at least one or more charge devices and a discharge device;
at least one or more ports including a first port and a second port connected between a battery and a charger via at least one or more data input terminals and a connector, and the at least one or more charge devices and the discharge device connected between the battery and the charger;
at least one or more resistors, transistors and capacitors connected via the first port and the second port; and
a controller configured to determine one or more charge control modes in response to detection of a threshold of voltage of the battery at the at least one or more data input terminals and detection of a fault or normal status of the at least one of charge devices, the charge control modes comprising a precharge mode, charge mode and a charge stop mode, wherein the controller is further configured to turn off outputs of the first port and the second port if the charge control modes are determined as the precharge mode, to turn off output of the first port and to turn on output of the second port if the charge control modes are determined as the charge mode, and to turn on output of the first port irrespective of the detected threshold voltage of the battery if the charge control modes are determined as the charge stop mode.

19. A method, comprising:
providing a battery charge control system between a battery and a charger via at least one or more data input terminals and a connector, the battery control system including a voltage level shift unit between a first port and a second port and the charger, and at least one or more charge devices and a discharge device;
determining one or more charge control modes in response to detection of a threshold of voltage of the battery at the data input terminals and a fault or normal status of the at least one of charge devices, the charge control modes comprising a precharge mode, charge mode and a charge stop mode;
selectively turning on or turning off of outputs of the first port and the second port and controlling the voltage level shift unit according to the determination, wherein controlling the voltage level shift unit includes shifting a voltage level of a data input terminal of the charger based on outputs of the first port and the second port, and wherein the voltage level shift unit includes:
a first resistor including a first terminal connected to a first input terminal;
a first transistor including a first terminal connected to a second terminal of the first resistor, a second terminal connected to a second input terminal, and a control terminal connected to the first port;
a second resistor including a first terminal connected to the second terminal of the first resistor;
a second transistor including a first terminal connected to a second terminal of the second resistor, a second terminal connected to the second input terminal, and a control terminal connected to the second port; and
a third resistor including a first terminal connected to the second terminal of the first resistor and a second terminal connected to the second input terminal.

* * * * *